United States Patent Office 3,451,407
Patented June 24, 1969

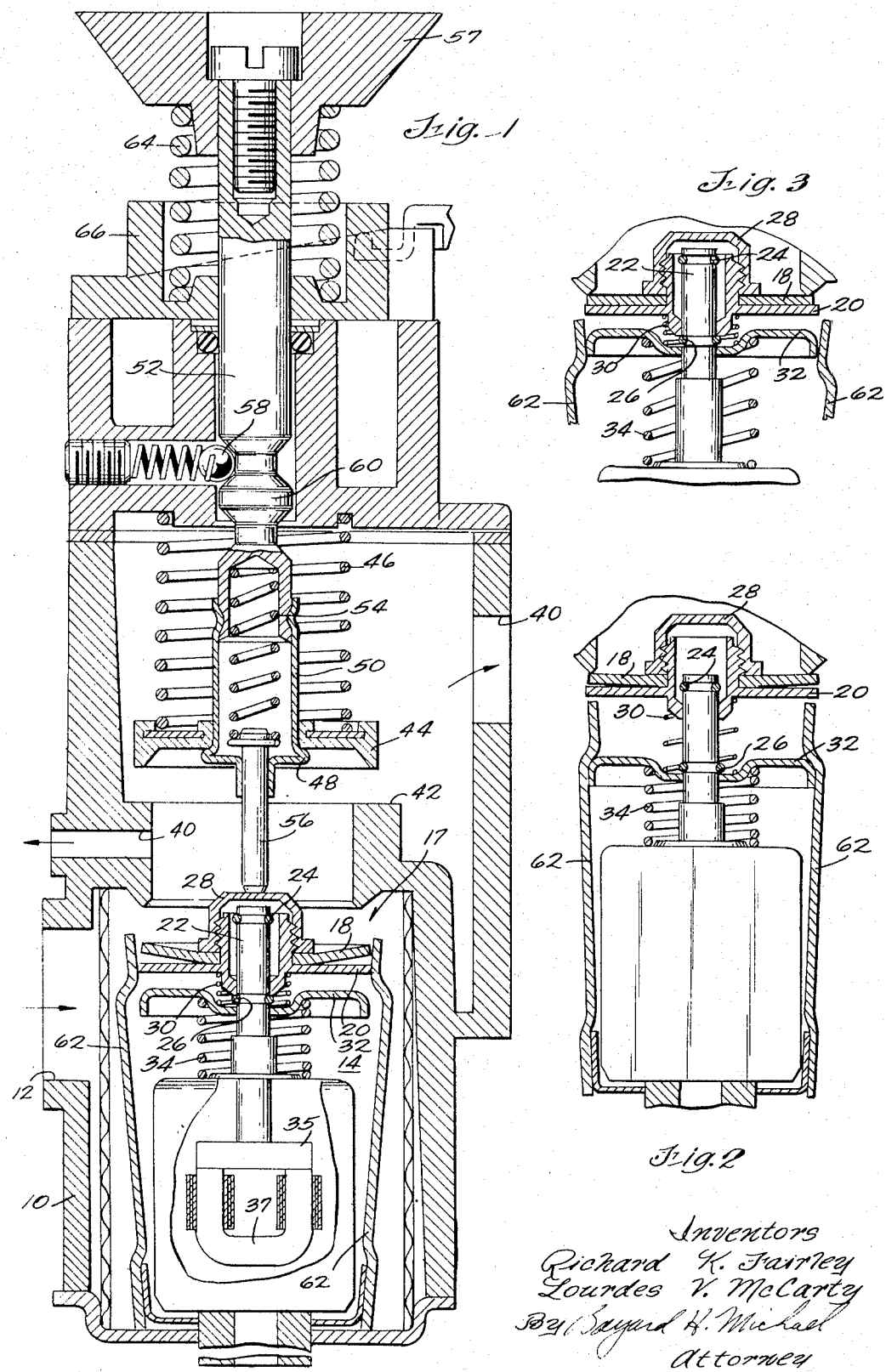

3,451,407
FLOW INTERRUPTER GAS CONTROL WITH SAFETY INTERLOCK PREVENTING RESET WHILE ELECTROMAGNET IS ENERGIZED
Richard K. Fairley, Deerfield, Ill., and Lourdes V. McCarty, Milwaukee, Wis., assignors to Controls Company of America, Melrose Park, Ill., a corporation of Delaware
Filed June 23, 1967, Ser. No. 648,489
Int. Cl. F23d 5/16; F23q 9/08
U.S. Cl. 137—66                    10 Claims

ABSTRACT OF THE DISCLOSURE

Depressing the knob closes the flow interrupter valve before opening the safety valve to allow pilot flow. After the electromagnet is energized the knob returns to normal to allow flow to the main burner outlet. Pulling the knob out allows the safety valve to close while the armature is retained and this allows the latch members to move under the valve to prevent reopening (resetting) until the armature is released and the release plate cams the latch members to inactive position.

Cross-references to related applications

While no apparatus effective on rotation of the knob is shown or described it is obvious that the structure permits such an arrangement and this coupled with the ability to actuate the control to "on," "off," and "reset" in any rotary position of the knob is claimed in copending application Ser. No. 648,940, filed June 23, 1967.

Background of invention

Gas controls provided with the thermoelectric safety mechanisms are old and well known. In such controls the electromagnet energized by the thermocouple holds the safety valve open until the thermocouple cools down sufficiently to indicate lack of a flame at the pilot burner. This has been an accepted safety device for many years but recently various approval authorities in Europe have required an additional function to overcome one possible unsafe condition inherent in the prior safety controls. Thus the prior controls could be operated to turn off all flow to the main and pilot burners but immediately following this operation the thermocouple would remain sufficiently hot to keep the electromagnet energized and hold the safety valve open for possibly 30 to 45 seconds. If the user were to operate the control to attempt to relight the burner during this interim period full flow of gas to the burner could occur and this could lead to serious consequences. Therefore, the approval authorities require some means to prevent flow to the burners during this cooldown period.

Thomas U.S. Patent 2,988,098 shows a flow interrupter type safety valve arrangement in which the actuating knob can be rotated to a given position to uncouple the safety valve from the armature for closure while the armature is retained. The valve and armature cannot be recoupled until the electromagnet has released the armature. This approach is, however, limited to a specified method of releasing the safety valve from the armature by a rotary action imparted to the control knob.

Summary of invention

The present invention is directed to the provision of a safety mechanism satisfying the new requirements but not requiring any specific rotary motion or the like to permit the safety valve to close when shutting off the flow to both burners. While the invention is shown in combination with a flow interrupter type reset mechanism it will be apparent that the invention is applicable to other type reset mechanisms, all of which are characterized by providing some means for moving the safety valve off of its seat while resetting the armature to the electromagnet. After the resetting has been accomplished the present invention continues a spring force holding the safety valve to the armature but with a force less than the spring force acting on the armature in the valve closing direction, which latter force is overcome by the force of the electromagnet. The safety valve is, however, mounted for limited movement relative to the armature and is spring biased in the valve closing direction by a weak spring which is sufficient to close the valve if the the first mentioned biasing force is removed. Therefore, when it is desired to interrupt all flow to the burners the spring force acting against the safety valve and armature assembly in the valve opening direction is removed to allow the weak spring to close the safety valve even though the electromagnet remains energized sufficiently to hold the armature. When the safety valve closes in this manner spring biased latches move in below the safety valve in a position to block opening of the safety valve even though the reset mechanism is actuated. The latch members remain so positioned until the electromagnet releases the armature at which time the armature and an associated release plate move in the valve closing direction to move the latch members out of their operative position and thus free the safety valve for subsequent movement in the opening direction when the reset mechanism is actuated.

This is a very simple device for preventing resetting during cool down of the thermocouple. The arrangement has utility with many types of reset mechanisms and is particularly suitable for use with the disclosed interrupter type reset mechanism which can additionally be rotated to any position without affecting operation of the "reset" or "off" function or without altering the set condition of the controls regulated by the operating knob by reason of rotational position.

Description of drawings

FIG. 1 is a vertical section through the control shown in the "on" position.

FIG. 2 is a fragmentary view showing the safety valve having closed without release of the armature and with the latch members having moved under the safety valve to prevent reopening of the valve.

FIG. 3 is a view comparable to FIG. 2 but shows the manner in which release of the armature opens the latch members and restores the control to a ready condition for resetting.

Description of preferred embodiment

The control housing 10 is provided with an inlet 12 leading to chamber 14 through the cylindrical filter 16. The safety valve 17 comprises a slightly dished resilient seating member 18 backed up by plate 20 which is slidable on stem 22 between the limits defined by the two wire snap rings 24, 26. The upper hub portion of plate 20 has a threaded section receiving the cap 28. The very light spring 30 urges the safety valve upwardly to the limit imposed by the upper ring 24. A release plate 32 is fixed on the stem with its outer rim turned downwardly and is urged upwardly by the compressed spring 34. The lower end of the shaft 22 carries the usual armature 35 inside the housing 36. Also contained in the housing is an electromagnet 37 which is connected to a thermocouple heated by the pilot flame to generate sufficient energy to energize the electromagnet sufficiently to hold the armature to the magnet but insufficiently to attract the armature. This is a customary use of electromagnetic safety controls. If the electromagnet becomes de-energized because the pilot flame goes out then spring 34 will move release plate 32 and stem 22 upwardly to close the safety valve on seat 38.

Immediately downstream of the safety valve there is a conduit 40 leading to the pilot burner. Immediately downstream of this conduit there is a seat 42 against which the flow interrupter valve 44 may close. This valve is urged downwardly by spring 46 to rest on the outwardly turned flange 48 of sleeve 50 connected to plunger or shaft 52 and containing spring 54 which acts against the head of pin 56 to urge the pin downwardly with a force greater than spring 30 but less than spring 34. In the position shown in FIG. 1 the thermocouple has been energized sufficiently to hold the safety valve open and there is flow to the pilot burner throughout outlet 40 and the interrupter valve is held open by reason of its engagement with the shoulder 48 on sleeve 50. In this position it will be noted that spring 54 is slightly compressed and yieldably holds safety valve 17 to release plate 32 (in effect, the armature). If the electromagnet becomes de-energized spring 34 has sufficient force to overcome spring 54 acting on pin 56 to move the safety valve 17 upwardly and close the safety valve to thereby interrupt all flow of gas.

If, starting from the normal "on" position shown in FIG. 1, the knob 57 is retracted, shaft 52 will be pulled outwardly which necessitates the movement of the spring loaded detent ball 58 until it is free to drop on the other side of the spindle portion 60 of the plunger. Thus it would then be seated on the underside of the spindle. At this point the pin 56 has taken up the lost motion because the head of the pin and the inside surface of the sleeve member 50 and has been withdrawn, whereupon the light spring 30 acting on the underside of the safety valve can move the safety valve 17 upwardly far enough for the flexible valve portion 18 to close against seat 38 and interrupt flow as shown in FIG. 2. This having occurred, the thermocouple will cool sufficiently to release the armature and allow spring 34 to move the release member 32 upwardly and continue the closing action on the safety valve. If, however, rather than waiting for the thermocouple to cool down, the user immediately tried to reset the control by pushing down on knob 57 past the position shown in FIG. 1 so as to first seat the interrupter valve 44, the action would be ineffective to accomplish the normal resetting action since the inwardly biased (self-biased) latches 62, 62 have moved in underneath the plate 20 of the safety valve and would prevent any opening of the safety valve. This would move the plate 20 down slightly to take up the clearance allowed for the latches to move under the plate but the dished flexible valve face 18 easily flexes enough to maintain the seal. Therefore, the user would of necessity have to wait until the thermocouple became cool to de-energize the electromagnet and allow the release plate 32 to move upwardly and spread the latches 62, 62 to the position of FIG. 3 in which they can no longer block downward movement of the safety valve. This, then, prevents the user from undertaking to light the burner under conditions which could allow full flow of raw gas to an unlighted burner.

Under normal operating conditions the resetting action occurs by depressing the knob 56 which will move the detent 58 out of the way and the interrupter valve 44 is seated first. During this period of time the spring 54 is compressed until it virtually goes solid, that is, acts as a solid member. Continued downward motion of the knob and its plunger 52 will now act to move the safety valve off its seat and move the armature to the electromagnet. This now allows flow only to the pilot conduit 40 since flow past the interrupter valve is prevented. After ignition has been effected, release of the knob allows spring 64 to return the knob to the normal position shown and the parts will have been restored to the normal operating or "on" condition shown in FIG. 1.

While the drawings show an interrupter type reset mechanism it will be appreciated that this safety interlock preventing reopening of the safety valve while the armature is still attracted by the electromagnet can be applied to other reset mechanisms since all of the various reset mechanisms require the application of a force to the safety valve to open it and reset the armature. It is quite obvious that it is only necessary that whatever means is used to reset the control be provided with the yieldable arrangement overcoming the force of the spring tending to separate the safety valve from the armature but which can be overcome by the armature loading spring. The yieldable arrangement can be separate from the reset pin. Therefore, the present invention is not limited to use in conjunction with an interrupter type reset but with such an interrupter type reset the mechanism has great utility by way of keeping the overall safety control quite simple and yet capable of satisfying the most stringent of requirements. The particular interrupter assembly shown here has further utility in that the knob and its associated plunger or shaft 52 can be rotated without affecting the operation of the reset in any rotary position of the knob. This, then, makes it possible to utilize the rotary motion of the knob to set some auxiliary apparatus. In the above referenced application the knob is shown as setting a thermostatic control which is then unaffected by actuation of the knob for any of the "on," "off," or "reset" functions in any rotary position. For such a purpose it is only necessary to spline the collar 66 to the shaft 52 so that the collar will rotate with the shaft and then a cam track or the like can be provided on the collar. Such details, however, are more fully explained (and claimed) in the referenced application.

We claim:
1. A gas control comprising a housing having an inlet and an outlet,
    an electromagnet energized in response to heating of a thermocouple by a flame,
    an armature movable between an attracted position in which it is held by the electromagnet when the electromagnet is energized and in a released position,
    an armature spring biasing the armature to its released position,
    a safety valve operative when closed to prevent flow to the outlet and carried by the armature for limited movement with respect thereto as well as movement with the armature,
        said limited movement allowing the safety valve to close when the armature is in its attracted position,
    a valve spring biasing the valve in the closing direction,
    spring means acting on the valve in opposition to the valve spring and exerting a force greater than the valve spring but less than the armature spring,
    said spring means being retractable to allow closure of the valve while the armature is held by the electromagnet.

2. A control according to claim 1 including reset means operative to open the valve and move the armature to the electromagnet.

3. A control according to claim 2 including latch means engageable with the valve upon closure of the valve while the armature is in its attracted position to thereby prevent opening the valve by operation of the reset means.

4. A control according to claim 3 including a release member carried by the armature and operative to hold the latch means in an inoperative position when the armature is in its released position.

5. A control according to claim 4 in which the valve includes a plate and a flexible face which can maintain a seating relationship with the valve seat while the plate moves within a limited range,
    said latch means being operative to move into position blocking movement of the plate beyond said limited range, closure of the valve while the armature is in attracted position normally moving said plate and said face to a position in which the plate offers adequate clearance for unobstructed movement of the latch means into operative position and subsequent operation of the reset means moves the plate against the latch means.

6. A control according to claim 5 in which the flexible valve face is in the form of a dished flexible annulus having its center portion sealed with respect to the plate whereby it can seat within the range of movement represented by the spacing between its periphery and the plate.

7. A control according to claim 6 in which the latch means includes a latch biased into operative position,
said release member acting upon movement of the armature to its released position to move the latch to an inoperative position and to retain the latch in such inoperative position.

8. A gas control according to claim 2 in which the spring means is a part of the reset means.

9. A gas control according to claim 8 in which the spring means transmits the reset force to the valve after first going solid, and including
a flow interrupter valve downstream of the safety valve and operative when closed to prevent flow to the outlet,
said interrupter valve being carried by the reset means and moved to closed position when the reset means is operated,
and a pilot outlet between the aforesaid valves.

10. A control according to claim 9 including latch means engageable with the valve upon closure of the valve while the armature is in its attracted position to thereby prevent opening the valve by operation of the reset means,
and a release member carried by the armature and operative to hold the latch means in an inoperative position when the armature is in its released position.

References Cited

UNITED STATES PATENTS

| | | | |
|---|---|---|---|
| 2,547,853 | 4/1951 | Butterfield | 137—65 |
| 2,962,036 | 11/1960 | Collins | 137—66 |
| 2,988,098 | 6/1961 | Thomas | 137—66 |

WILLIAM F. O'DEA, *Primary Examiner.*

ROBERT G. NILSON, *Assistant Examiner.*

U.S. Cl. X.R.

431—54